US011509384B2

(12) United States Patent
Ganti et al.

(10) Patent No.: US 11,509,384 B2
(45) Date of Patent: Nov. 22, 2022

(54) BEAM SELECTION IN IDLE MODE TO AVOID MONITORING OCCASION COLLISION

(71) Applicant: QUALCOMM Incorporated, San Diego, CA (US)

(72) Inventors: Kamalakar Ganti, San Diego, CA (US); Anindya Majumder, San Diego, CA (US); Ammar Kitabi, San Diego, CA (US); Jun Hu, San Diego, CA (US); Qingxin Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 17/034,374

(22) Filed: Sep. 28, 2020

(65) Prior Publication Data

US 2022/0103231 A1     Mar. 31, 2022

(51) Int. Cl.
*H04B 7/08*          (2006.01)
*H04W 76/11*      (2018.01)
(Continued)

(52) U.S. Cl.
CPC .............. *H04B 7/088* (2013.01); *H04W 8/18* (2013.01); *H04W 8/26* (2013.01); *H04W 24/08* (2013.01);
(Continued)

(58) Field of Classification Search
CPC ........ H04B 7/08; H04B 7/088; H04B 7/0695; H04B 7/0639; H04B 7/0408; H04B 7/043;
(Continued)

(56) References Cited

U.S. PATENT DOCUMENTS 11,297,659 B2 * 4/2022 Krishnamoorthy et al. ................ H04W 74/085
2017/0207828 A1 * 7/2017 Jung et al. ........... H04B 7/0408
(Continued)

FOREIGN PATENT DOCUMENTS

| EP | 3627721 A1 | 3/2020 |
| WO | WO-2019069504 A1 | 4/2019 |
| WO | WO 2020/243265 A1 * | 12/2020 |
| WO | WO 2020/247043 A1 * | 12/2020 | ............ H04W 88/06 |

OTHER PUBLICATIONS

International Search Report and Written Opinion—PCT/US2021/071228—ISA/EPO—dated Nov. 19, 2021.
(Continued)

*Primary Examiner* — Meless N Zewdu
(74) *Attorney, Agent, or Firm* — Harrity & Harrity, LLP

(57) ABSTRACT

Various aspects of the present disclosure generally relate to wireless communication. In some aspects, a user equipment (UE) may measure a plurality of beams, from a base station, wherein the plurality of beams are associated with a corresponding plurality of monitoring occasions for a first subscription of the UE. The UE may determine whether a monitoring occasion for a second subscription of the UE collides with one or more of the plurality of monitoring occasions, for the first subscription of the UE, corresponding with the plurality of beams. The UE may transmit, to the base station, an indication of a selected beam, from the plurality of beams, based at least in part on the measuring and the determining. Numerous other aspects are provided.

31 Claims, 10 Drawing Sheets

(51) Int. Cl.
*H04W 8/18* (2009.01)
*H04W 8/26* (2009.01)
*H04W 24/08* (2009.01)
*H04W 24/10* (2009.01)
*H04W 60/00* (2009.01)

(52) U.S. Cl.
CPC .......... *H04W 24/10* (2013.01); *H04W 60/00* (2013.01); *H04W 76/11* (2018.02)

(58) Field of Classification Search
CPC .......................... H04B 7/0617; H04B 7/0897; H04B 10/0795; H04B 10/0775; H04W 24/08; H04W 24/10; H04W 76/11; H04W 60/00; H04W 8/18; H04W 8/26; H04W 4/60; H04W 4/50; H04W 4/029; H04W 4/08; H04W 88/02; H04W 68/00; H04W 68/005; H04W 68/02; H04W 68/12; H04W 72/00; H04W 84/027; H04W 88/18; H04W 12/45; H04W 12/50; H04W 12/61; H04W 88/06; H04W 88/08; H04W 76/28; H04W 16/28; H04W 72/046; H04W 8/20; H04W 8/08; H04W 88/00; H04W 76/00; H04W 76/10
See application file for complete search history.

(56) References Cited

U.S. PATENT DOCUMENTS

| | | | |
|---|---|---|---|
| 2018/0368099 A1 | 12/2018 | Chen et al. | |
| 2019/0268794 A1* | 8/2019 | Tsai et al. | H04W 24/10 |
| 2020/0076487 A1* | 3/2020 | Liu et al. | H04B 7/0617 |
| 2020/0137821 A1* | 4/2020 | Cirik et al. | H04W 76/19 |
| 2020/0196273 A1 | 6/2020 | Ozturk et al. | |
| 2020/0329455 A1* | 10/2020 | Ryu et al. | H04W 68/02 |
| 2020/0367224 A1* | 11/2020 | Persson et al. | H04W 72/046 |
| 2021/0258064 A1* | 8/2021 | Yu et al. | H04B 7/0695 |
| 2021/0321267 A1* | 10/2021 | Kim | H04W 16/28 |
| 2021/0351835 A1* | 11/2021 | Woo et al. | H04B 7/088 |
| 2021/0399821 A1* | 12/2021 | Chung et al. | H04J 11/005 |

OTHER PUBLICATIONS

Qualcomm Incorporated, et al., "Solution for Paging Collision Avoidance", 3GPP Draft, SA WG2 Meeting #136, S2-1912399, 3rd Generation Partnership Project (3GPP), Mobile Competence Centre 650, Route Des Lucioles; F-06921 Sophia-Antipolis Cedex; France, vol. SA WG2, No. Reno, USA; Nov. 18, 2019-Nov. 22, 2019, Nov. 19, 2019 (Nov. 19, 2019), XP051827102, pp. 1-7, Retrieved from the Internet: URL: https://ftp.3gpp.org/Meetings_3GPP_SYNC/SA2/Docs/S2-1912399.zipS2-1912399_was_11729_paging collision. doc [retrieved on Nov. 19, 2019], paragraph [0002], pp. 4. 5.

\* cited by examiner

BEAM SELECTION IN IDLE MODE TO AVOID MONITORING OCCASION COLLISION

FIELD OF THE DISCLOSURE

Aspects of the present disclosure generally relate to wireless communication and to techniques and apparatuses for beam selection in idle mode to avoid monitoring occasion collision.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes measuring a plurality of beams, from a base station, wherein the plurality of beams are associated with a corresponding plurality of monitoring occasions for a first subscription of the UE; determining whether a monitoring occasion for a second subscription of the UE collides with one or more of the plurality of monitoring occasions, for the first subscription of the UE, corresponding with the plurality of beams; and transmitting, to the base station, an indication of a selected beam, from the plurality of beams, based at least in part on the measuring and the determining.

In some aspects, a method of wireless communication performed by a base station includes transmitting using a plurality of beams, wherein the plurality of beams are associated with a corresponding plurality of monitoring occasions for a UE; and receiving, from the UE, an indication of a selected beam, from the plurality of beams, based at least in part on the monitoring occasion corresponding to the selected beam.

In some aspects, a UE for wireless communication includes a memory and one or more processors operatively coupled to the memory, the memory and the one or more processors configured to measure a plurality of beams, from a base station, wherein the plurality of beams are associated with a corresponding plurality of monitoring occasions for a first subscription of the UE; determine whether a monitoring occasion for a second subscription of the UE collides with one or more of the plurality of monitoring occasions, for the first subscription of the UE, corresponding with the plurality of beams; and transmit, to the base station, an indication of a selected beam, from the plurality of beams, based at least in part on the measuring and the determining.

In some aspects, a base station for wireless communication includes a memory and one or more processors operatively coupled to the memory, the memory and the one or more processors configured to transmit using a plurality of beams, wherein the plurality of beams are associated with a corresponding plurality of monitoring occasions for a UE; and receive, from the UE, an indication of a selected beam, from the plurality of beams, based at least in part on the monitoring occasion corresponding to the selected beam.

In some aspects, a non-transitory computer-readable medium storing a set of instructions for wireless communication includes one or more instructions that, when executed by one or more processors of a UE, cause the UE to measure a plurality of beams, from a base station, wherein the plurality of beams are associated with a corresponding plurality of monitoring occasions for a first subscription of the UE; determine whether a monitoring occasion for a second subscription of the UE collides with one or more of the plurality of monitoring occasions, for the first subscription of the UE, corresponding with the plurality of beams; and transmit, to the base station, an indication of a selected beam, from the plurality of beams, based at least in part on the measuring and the determining.

In some aspects, a non-transitory computer-readable medium storing a set of instructions for wireless communication includes one or more instructions that, when executed by one or more processors of a base station, cause the base station to transmit using a plurality of beams, wherein the plurality of beams are associated with a corresponding plurality of monitoring occasions for a UE; and receive, from the UE, an indication of a selected beam, from the plurality of beams, based at least in part on the monitoring occasion corresponding to the selected beam.

In some aspects, an apparatus for wireless communication includes means for measuring a plurality of beams, from a base station, wherein the plurality of beams are associated with a corresponding plurality of monitoring occasions for a first subscription of the apparatus; means for determining whether a monitoring occasion for a second subscription of the apparatus collides with one or more of the plurality of monitoring occasions, for the first subscription of the apparatus, corresponding with the plurality of beams; and means for transmitting, to the base station, an indication of a selected beam, from the plurality of beams, based at least in part on the measuring and the determining.

In some aspects, an apparatus for wireless communication includes means for transmitting using a plurality of beams, wherein the plurality of beams are associated with a corresponding plurality of monitoring occasions for a UE; and means for receiving, from the UE, an indication of a selected beam, from the plurality of beams, based at least in part on the monitoring occasion corresponding to the selected beam.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
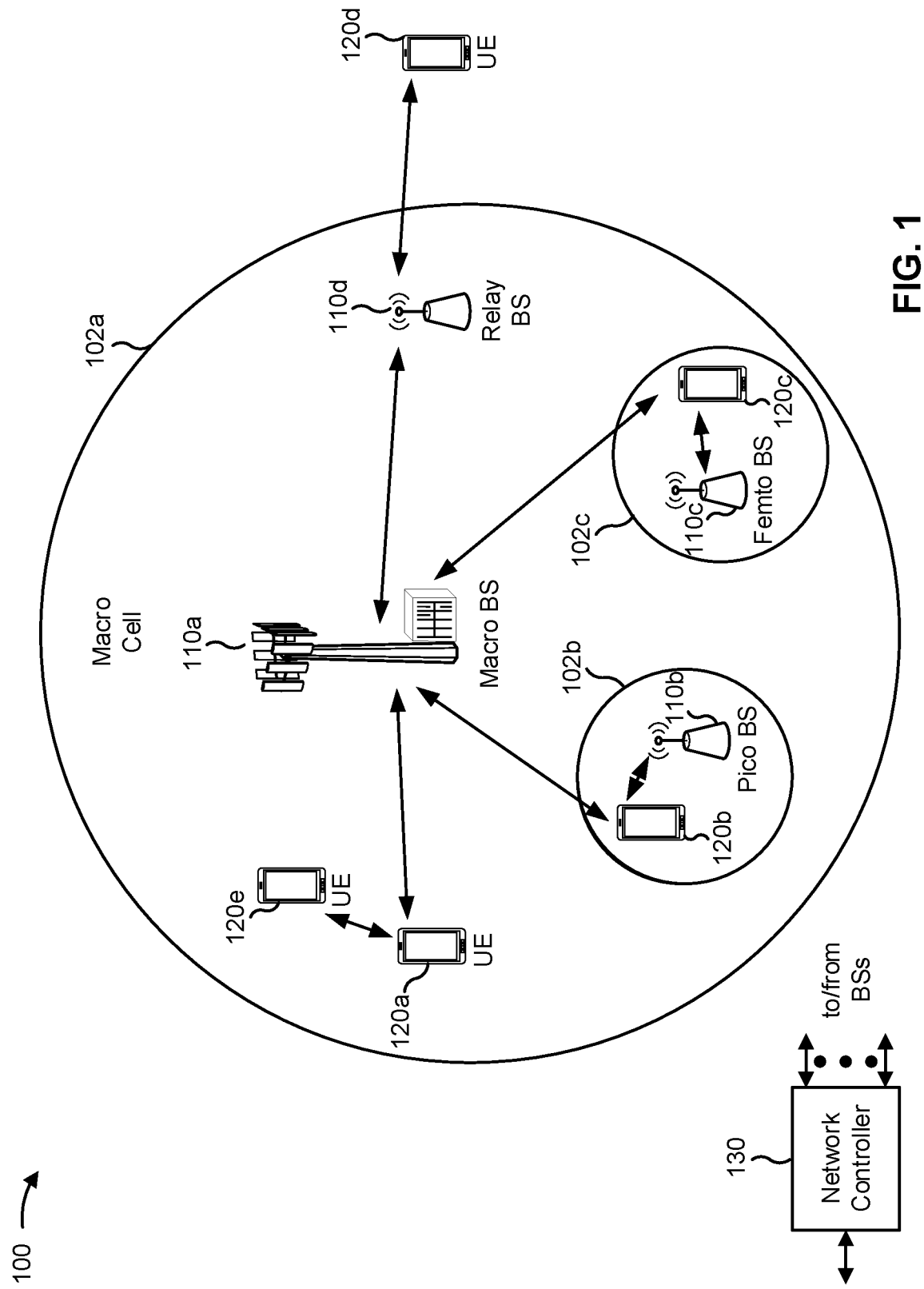
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
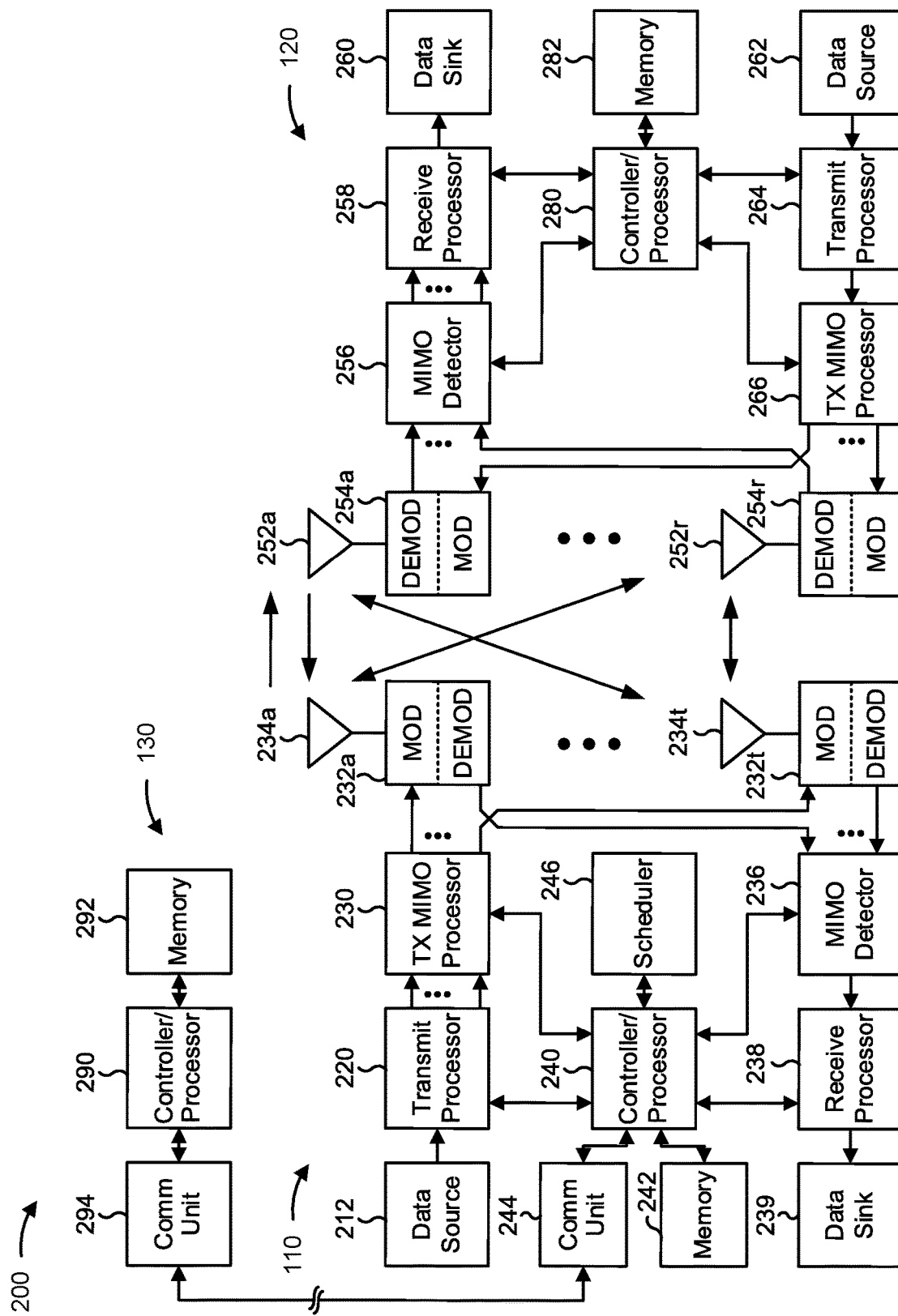
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-8.

Controller/processor 240 of base station 110, controller/processor 280 of UE 120, and/or any other component(s) of FIG. 2 may perform one or more techniques associated with beam selection in idle mode to avoid monitoring occasion collision, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like.

In some aspects, a UE (e.g., UE 120 of FIG. 1, multi-SIM UE 120 of FIGS. 4 and 6, and/or apparatus 900 of FIG. 9) may include means for measuring a plurality of beams, from a base station (e.g., base station 110 of FIG. 1, base station 410a of FIGS. 4 and 6, and/or apparatus 1000 of FIG. 10), wherein the plurality of beams are associated with a corresponding plurality of monitoring occasions for a first subscription of the UE; means for determining whether a monitoring occasion for a second subscription of the UE collides with one or more of the plurality of monitoring occasions, for the first subscription of the UE, corresponding with the plurality of beams; and/or means for transmitting, to the base station, an indication of a selected beam, from the plurality of beams, based at least in part on the measuring and the determining. The means for the UE to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE may further include means for requesting a new identifier for the first subscription of the UE when all of the plurality of monitoring occasions, for the first subscription of the UE, collide with the monitoring occasion for the second subscription of the UE, wherein the plurality of beams are associated with a new plurality of monitoring occasions, for the first subscription of the UE, based at least in part on the new identifier; and/or means for determining whether the monitoring occasion for the second subscription of the UE collides with the new plurality of monitoring occasions, for the first subscription of the UE, wherein the selected beam is based at least in part on determining whether the monitoring occasion for the second subscription of the UE collides with the new plurality of monitoring occasions.

In some aspects, the UE may further include means for identifying a network operator associated with the first subscription of the UE.

In some aspects, a base station (e.g., base station 110 of FIG. 1, base station 410a of FIGS. 4 and 6, and/or apparatus 1000 of FIG. 10) may include means for transmitting using a plurality of beams, wherein the plurality of beams are associated with a corresponding plurality of monitoring occasions for a UE (e.g., UE 120 of FIG. 1, multi-SIM UE 120 of FIGS. 4 and 6, and/or apparatus 900 of FIG. 9); and/or means for receiving, from the UE, an indication of a selected beam, from the plurality of beams, based at least in part on the monitoring occasion corresponding to the selected beam. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station may further include means for receiving, from the UE, a request for a new identifier based at least in part on the plurality of monitoring occasions; and/or means for transmitting, to the UE, the new identifier, wherein the plurality of beams are associated with a new plurality of monitoring occasions, for the UE, based at least in part on the new identifier, and wherein the selected beam is based at least in part on the new plurality of monitoring occasions.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
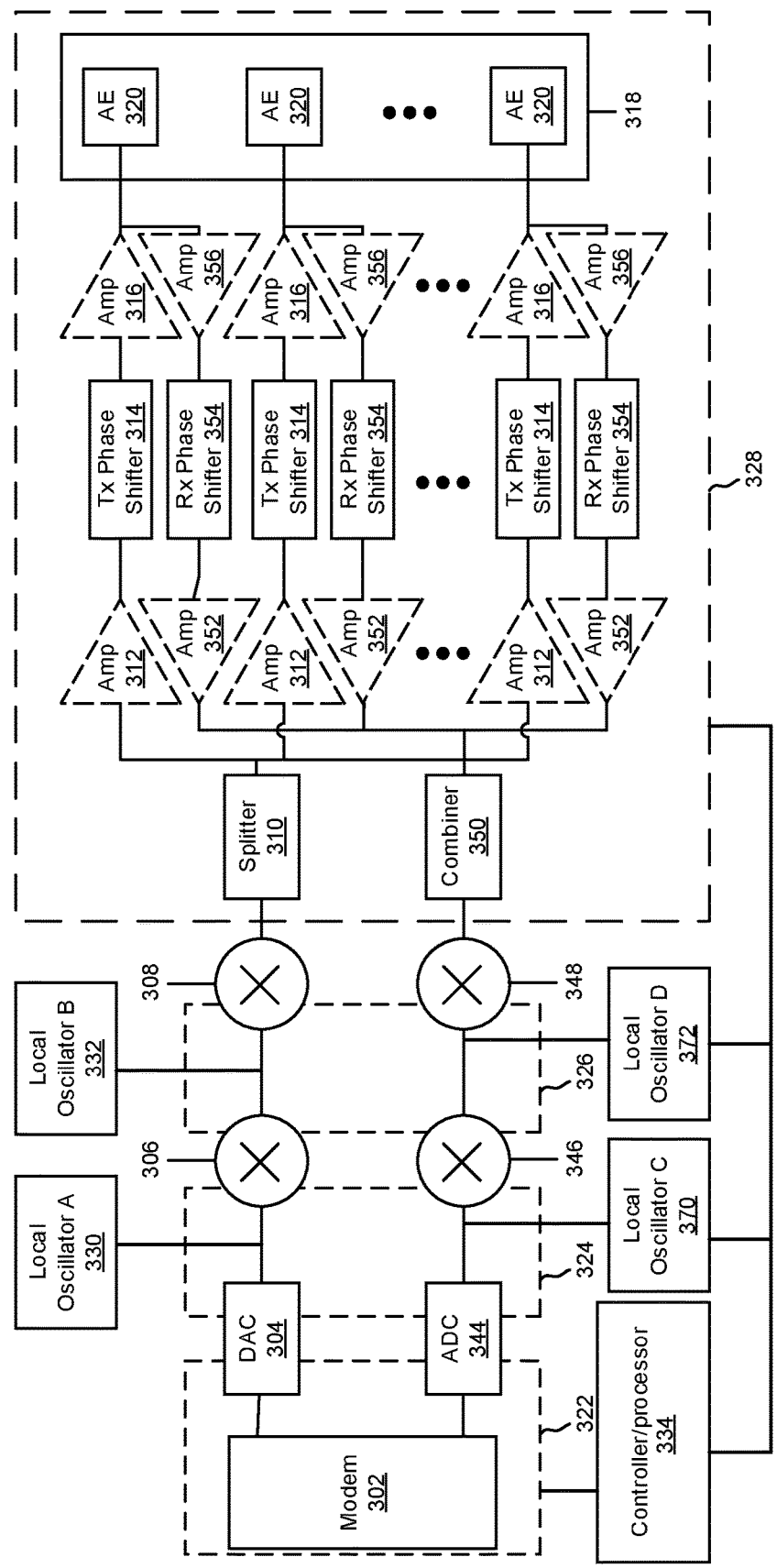
FIG. 3 is a diagram illustrating an example of beamforming architecture that supports beamforming for millimeter wave (mmW) communications, in accordance with various aspects of the present disclosure.

FIG. 3 is a diagram illustrating an example beamforming architecture 300 that supports beamforming for mmW communications, in accordance with various aspects of the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 and/or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the controller/processor 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312 and 316 may be controlled independently (e.g., by the modem 302 or the controller/processor 334) to provide independent control of the gain for each antenna element 320. For example, the modem 302 and/or the controller/processor 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312 and 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the controller/processor 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

As indicated above, FIG. 3 is provided as an example. Other examples may differ from what is described with regard to FIG. 3.

Figure 4:
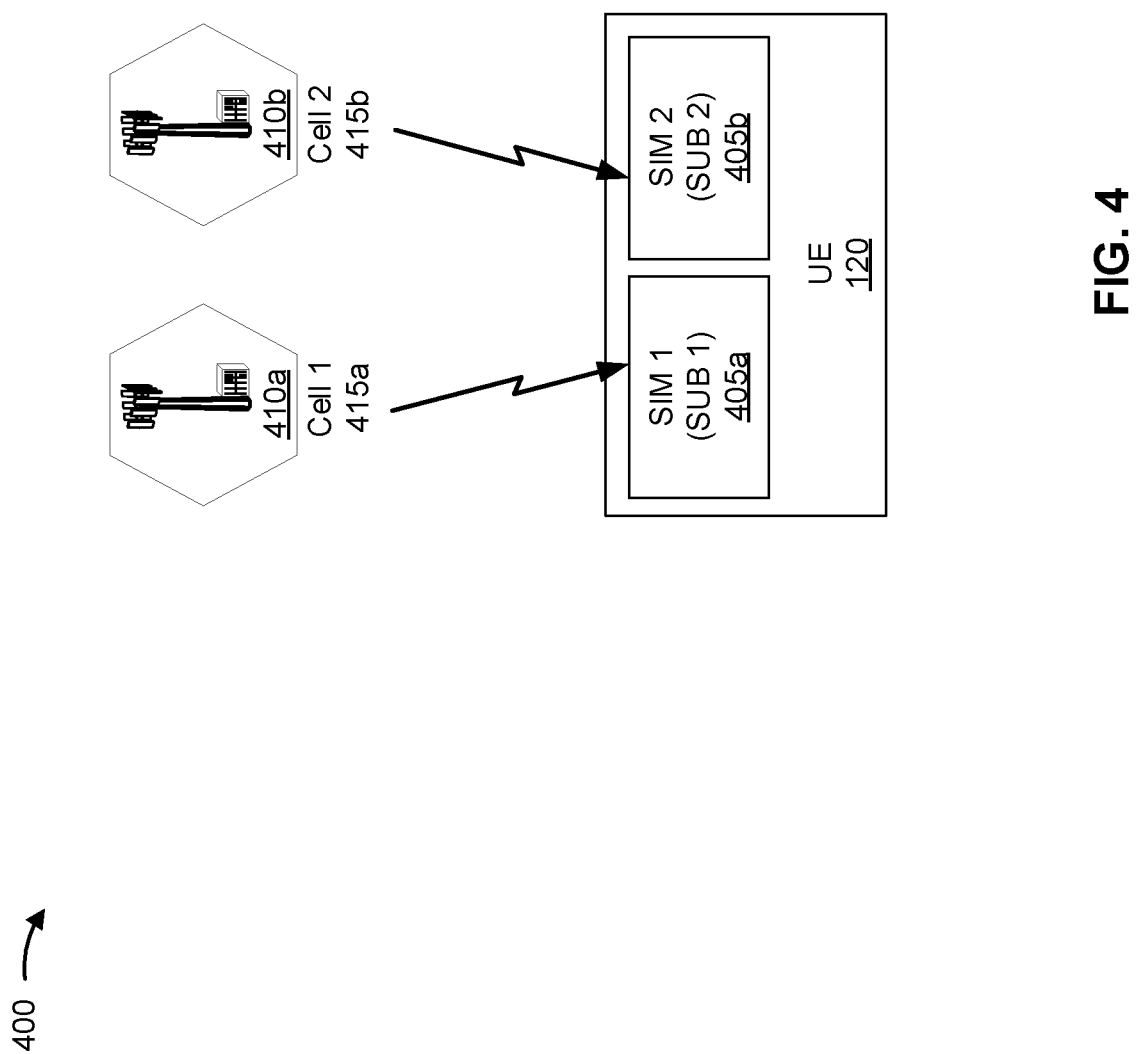
FIG. 4 is a diagram illustrating an example of a multi-subscriber identity module (SIM) UE, in accordance with various aspects of the present disclosure.

FIG. 4 is a diagram illustrating an example 400 of a multi-SIM UE, in accordance with various aspects of the present disclosure. As shown in FIG. 4, a UE 120 may be a multiple SIM (multi-SIM) UE that includes multiple SIMs (two or more SIMs), shown as a first SIM 405*a* and a second SIM 405*b*. The first SIM 405*a* may be associated with a first subscription (shown as SUB 1), and the second SIM 405*b* may be associated with a second subscription (shown as SUB 2). A subscription may include a subscription with a network operator (for example, a mobile network operator (MNO)) that enables the UE 120 to access a wireless network (for example, a radio access network (RAN)) associated with the network operator.

A SIM 405 may be a removable SIM (for example, a SIM card) or an embedded SIM. A SIM 405 may include an integrated circuit that securely stores an international mobile subscriber identity (IMSI) and a security key, which are used to identify and authenticate a corresponding subscription associated with the SIM 405. In some cases, a SIM 405 may store a list of services that the UE 120 has permission to access using a subscription associated with the SIM 405, such as a data service or a voice service, among other examples.

As further shown in FIG. 4, the UE 120 may communicate (for example, in a connected mode, an idle mode, or an inactive mode) with a first base station 410*a* via a first cell 415*a* (shown as Cell 1) using the first SIM 405*a*. In this case, a first subscription (SUB 1) of the UE 120 may be used to access the first cell 415*a* (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 410*b* via a second cell 415*b* (shown as Cell 2) using the second SIM 405*b*. In this case, a second subscription (SUB 2) of the UE 120 may be used to access the second cell 415*b* (for example, using a second IMSI for UE identification, using a second security key for UE authentication, using a second list of services that the UE 120 is permitted to access using the second subscription, or by counting data or voice usage on the second cell against the second subscription, among other examples).

The first base station 410*a* and/or the second base station 410*b* may include one or more of the base stations 110 described above in connection with FIG. 1. Although the first cell 415*a* and the second cell 415*b* are shown as being provided by different base stations, in some aspects, the first cell 415 and the second cell 415*b* may be provided by the same base station. Thus, in some aspects, the first base station 410*a* and the second base station 410*b* may be integrated into a single base station.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples.

As indicated above, FIG. 4 is provided as an example. Other examples may differ from what is described with regard to FIG. 4.

Figure 5:
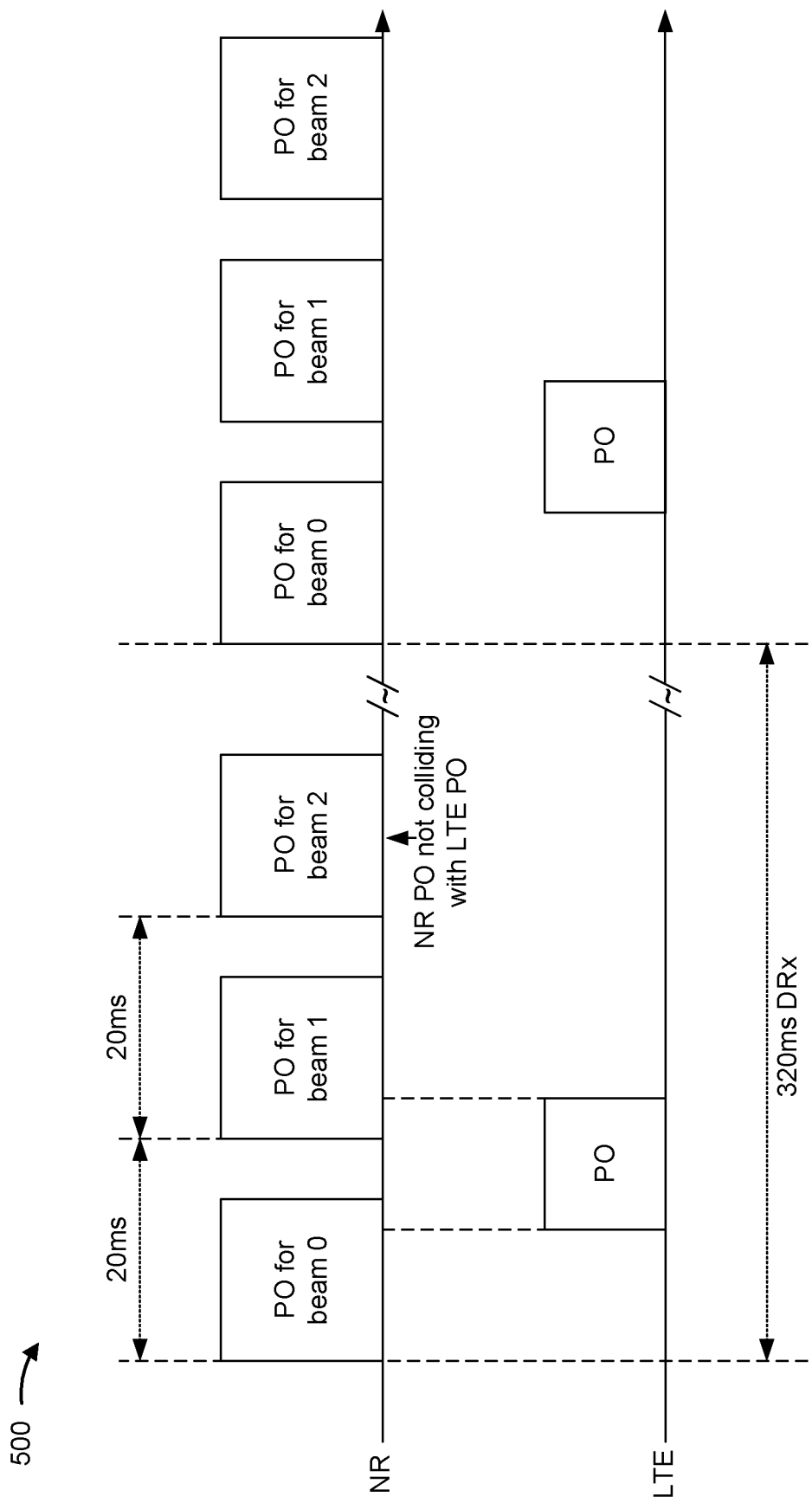
FIG. 5 is a diagram illustrating an example of monitoring occasion collision, in accordance with various aspects of the present disclosure.

FIG. 5 is a diagram illustrating an example 500 of monitoring occasion collision, in accordance with various aspects of the present disclosure. In example 500, a first subscription of a UE may be associated with an NR wireless network, and a second subscription of the UE may be associated with a legacy (e.g., an LTE) wireless network. Although described below in connection with collision between NR monitoring occasions and legacy monitoring occasions, the description similarly applies to collision between monitoring occasions for a first NR wireless network and monitoring occasions for a second NR wireless network.

As shown in FIG. 5, the second subscription may be provided a monitoring occasion (e.g., for a paging occasion (PO) and/or other communications) when the second subscription enters an idle mode (or an inactive state). Moreover, the first subscription may be provided a plurality of monitoring occasions for a plurality of beams (e.g., formed as described above in connection with FIG. 3) broadcast by a base station for the NR wireless network (e.g., broadcast as a synchronization signal block (SSB) and/or other similar broadcast signal). As shown in example 500, these monitoring occasions may each be 20 ms or another length of time. Accordingly, the UE may select a beam and thus a corresponding monitoring occasion when the first subscription enters an idle mode (or an inactive state).

Generally, the UE selects one of the plurality of beams to use based on signal strengths of the plurality of beams. However, the UE may select a beam that has a corresponding monitoring occasion that collides with the monitoring occasion for the second subscription. Accordingly, the UE may be unable to respond to paging messages on both the first subscription and the second subscription, which increases latency, network overhead, and resource consumption by the UE as well as base stations for the NR wireless network and the legacy wireless network. Moreover, as shown in FIG. 5, these collisions may persist through time because idle cycles (e.g., idle DRx cycles) of most RATs are 320 ms.

Some techniques and apparatuses described herein enable a UE (e.g., UE 120) to respond to paging messages on both a first subscription and a second subscription. As a result, the UE 120 may reduce latency and network overhead as well as conserve resources for the UE 120 as well as base stations (e.g., base station 410*a* and base station 410*b*) for an NR wireless network and a legacy wireless network or for two NR wireless networks.

As indicated above, FIG. 5 is provided as an example. Other examples may differ from what is described with respect to FIG. 5.

Figure 6:
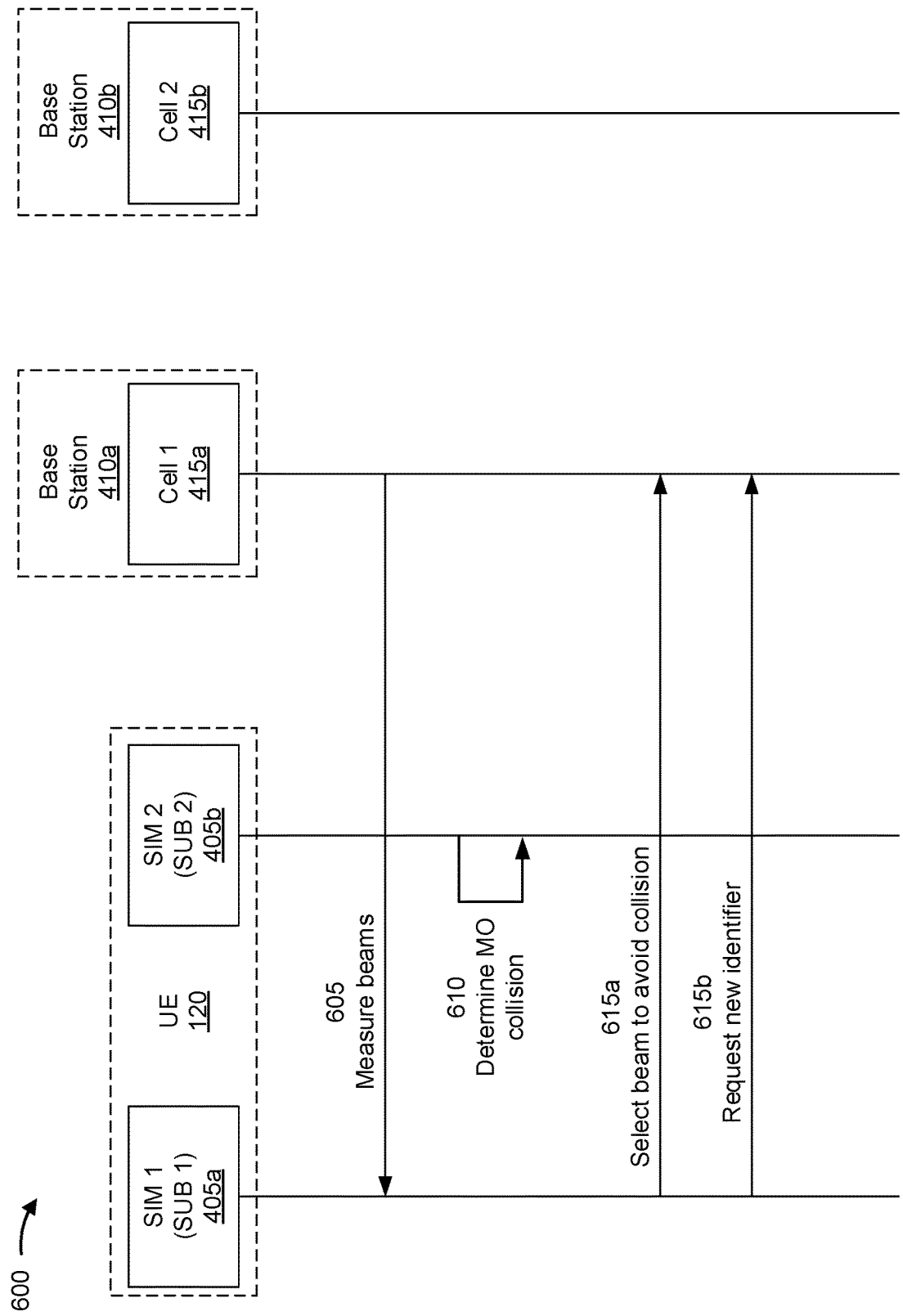
FIG. 6 is a diagram illustrating an example associated with beam selection in idle mode to avoid monitoring occasion collision, in accordance with various aspects of the present disclosure.

FIG. 6 is a diagram illustrating an example 600 associated with beam selection in idle mode to avoid monitoring occasion collision, in accordance with various aspects of the present disclosure. FIG. 6 shows an example call flow where a multi-subscriber UE 120 selects a beam, for a first subscription of the UE 120, to avoid monitoring occasion collision with a second subscription of the UE 120. As shown in FIG. 6, the UE 120 may be a multi-SIM UE that includes multiple SIMs, shown as a first SIM 405*a* and a second SIM 405*b* (e.g., as described above in connection with FIG. 4). As also described above, the first SIM 405*a* may be associated with a first subscription (shown as SUB 1), and the second SIM 405*b* may be associated with a second subscription (shown as SUB 2). Although the description below will focus on multiple SIMs, the description applies equally to any other techniques for associating a plurality of subscriptions with the UE 120, such as embedded SIMs, virtual SIMs, other techniques for storing different IMSIs, and/or the like. Moreover, although the description below will focus on two subscriptions, the description similarly applies to other numbers of subscriptions for the UE 120.

As further shown in FIG. 6, the UE 120 may communicate with a first base station 410*a* via a first cell 415*a* (shown as Cell 1) using the first SIM 405*a*, and the UE 120 may communicate with a second base station 410*b* via a second cell 415b (shown as Cell 2) using the second SIM 405b (e.g., as described above in connection with FIG. 4). In example 600, the first base station 410a and the second base station 410b are shown as separate base stations; however, in some aspects, the first base station 410a and the second base station 410b may be integrated into a single base station 110 (e.g., as described above in connection with FIG. 1). In some aspects, the first cell 415a may be included in the first wireless network, and the second cell 415b may be included in the second wireless network.

In some aspects, the first subscription (e.g., SUB 1 accessed using SIM 405a) of the UE 120 may be associated with a 5G network, and the second subscription (e.g., SUB 2 accessed using SIM 405b) of the UE 120 may be associated with a legacy RAT (e.g., an LTE RAT, a 3G RAT, and/or other legacy RAT). As an alternative, the first subscription (e.g., SUB 1 accessed using SIM 405a) of the UE 120 may be associated with a first 5G network, and the second subscription (e.g., SUB 2 accessed using SIM 405b) of the UE 120 may be associated with a second 5G network. For example, the UE 120 may use the first 5G network for data service (e.g., using data distribution service (DDS) technology) and the second 5G network for voice service (e.g., using non-DDS technology).

As shown in connection with reference number 605, the base station 410a may transmit, and the UE 120 may measure a plurality of beams. The plurality of beams may be associated with a corresponding plurality of monitoring occasions for a first subscription (e.g., SUB 1 accessed using SIM 405a) of the UE 120. Accordingly, each beam of the plurality of beams may be associated with a different monitoring occasion. In some aspects, the plurality of monitoring occasions may be periodic (e.g., each monitoring occasion repeating after a period of slots, frames, time (such as 320 ms), and/or another measurement in a time domain).

In some aspects, the base station 410a may transmit the plurality of beams by sweeping a reference signal using the plurality of beams (e.g., using hardware as described above in connection with FIG. 3). For example, the base station 410a may sweep an SSB, a channel state information reference signal (CSI-RS), a positioning reference signal (PRS), and/or another reference signal using the plurality of beams.

In some aspects, the UE 120 may measure the plurality of beams by measuring an RSRP for each beam of the plurality of beams. Accordingly, the UE 120 may determine an RSRP and/or other measurement of signal strength for the reference signal swept using the plurality of beams (e.g., as described above). When the reference signal includes an SSB, the measurement may be represented as $SSB_{RSRP}^{i}$, where i identifies a corresponding beam out of the plurality of beams for that measurement.

As shown in connection with reference number 610, the UE 120 may determine whether a monitoring occasion for a second subscription (e.g., SUB 2 accessed using SIM 405b) of the UE 120 collides with one or more of the plurality of monitoring occasions, for the first subscription (e.g., SUB 1 accessed using SIM 405a) of the UE 120, corresponding with the plurality of beams. For example, the UE 120 may determine whether a frame, a slot, one or more symbols, and/or other indicator of time, occupied by the monitoring occasion for the second subscription, at least partially overlaps with a frame, a slot, one or more symbols, and/or other indicator of time occupied by each monitoring occasion of the plurality of monitoring occasions for the first subscription.

In some aspects, the second subscription may be associated with an additional plurality of monitoring occasions. For example, the base station 410b may transmit an additional plurality of beams associated with the corresponding plurality of monitoring occasions for the second subscription (e.g., SUB 2 accessed using SIM 405b) of the UE 120. Accordingly, the UE 120 may determine whether one or more of the additional plurality of monitoring occasions, for the second subscription of the UE 120, corresponding with the additional plurality of beams, collides with one or more of the plurality of monitoring occasions, for the first subscription (e.g., SUB 1 accessed using SIM 405a) of the UE 120, corresponding with the plurality of beams. For example, the UE 120 may determine whether a frame, a slot, one or more symbols, and/or other indicator of time, occupied by each monitoring occasion of the additional plurality of monitoring occasions for the second subscription, at least partially overlaps with a frame, a slot, one or more symbols, and/or other indicator of time occupied by each monitoring occasion of the plurality of monitoring occasions for the first subscription.

As an alternative, the UE 120 may prioritize one of the first subscription or the second subscription over the other of the first subscription or the second subscription. For example, the UE 120 may prioritize a subscription providing voice service over a subscription providing data service. In one example, the UE 120 may select one of the additional plurality of monitoring occasions for the second subscription based at least in part on measurements of the additional plurality of beams. In some aspects, the UE 120 may select one of the additional plurality of monitoring occasions based at least in part on a corresponding one of the additional plurality of beams having a highest RSRP and/or other indicator of signal strength. For example, the UE 120 may select beam i based at least in part on $SSB_{RSRP}^{i}$ being the highest amongst the additional plurality of beams. Accordingly, the UE 120 may prioritize the second subscription and determine whether the selected monitoring occasion for the second subscription of the UE 120 collides with one or more of the plurality of monitoring occasions, for the first subscription of the UE 120. For example, the UE 120 may determine whether a frame, a slot, one or more symbols, and/or other indicator of time, occupied by the selected monitoring occasion for the second subscription, at least partially overlaps with a frame, a slot, one or more symbols, and/or other indicator of time occupied by each monitoring occasion of the plurality of monitoring occasions for the first subscription.

As shown in connection with reference number 615a, the UE 120 may transmit, and the base station 410a may receive, an indication of a selected beam, from the plurality of beams, based at least in part on the measuring and the determining. For example, the UE 120 may determine that a corresponding monitoring occasion for the selected beam does not collide with the monitoring occasion for the second subscription of the UE 120.

In some aspects, the selected beam may further satisfy a threshold based at least in part on the measuring. For example, the UE 120 may compute a difference in measurements between the beams according to $Delta\_RSRP_i = SSB_{RSRP}^{strongest} - SSB_{RSRP}^{i}$, where $SSB_{RSRP}^{strongest}$ is a highest RSRP and/or other measurement of signal strength amongst the plurality of beams, and i is a current beam of the plurality of beams. The selected beam may satisfy a threshold, such as $Delta\_RSRP_i <$ threshold, where i is the selected beam, and the threshold may be 3 dB and/or another value. The threshold may be predetermined (e.g., programmed into the UE 120 and/or other preconfigured), for example, according to 3GPP specifications and/or another standard. As an alternative, the UE 120 may determine the threshold (e.g., based at least in part on an average or a median of RSRPs and/or other measurements of signal strength for the plurality of beams) and/or the base station 410*a* may determine the threshold (e.g., based at least in part on measurements of sounding reference signals (SRSs) and/or another indicator of channel conditions with the UE 120) and provide information identifying the threshold to the UE 120.

In some aspects, two or more of the plurality of beams may be associated with corresponding monitoring occasions, for the first subscription (e.g., SUB 1 accessed using SIM 405*a*) of the UE 120, that do not collide with the monitoring occasion for the second subscription (e.g., SUB 2 accessed using SIM 405*b*) of the UE 120. Accordingly, the selected beam may be one of the two or more beams and may satisfy a condition. For example, the UE 120 may select beam i based at least in part on $SSB_{RSRP}{}^{i}$ being the highest amongst the two or more of the plurality of beams.

Additionally with or as an alternative to one or more steps as described in connection with reference number 615*a*, and as shown in connection with reference number 615*b*, the UE 120 may request, from the base station 410*a*, a new identifier for the first subscription (e.g., SUB 1 accessed using SIM 405*a*) of the UE 120. For example, the new identifier may include a global unique temporary identifier (GUTI). In some aspects, the plurality of monitoring occasions may be based at least in part on an expression of the form (SFN+ PF_offset)mod T=(T div N)*(UE_ID mod N), where SFN is a system frame number, PF_offset is a paging frame offset, T is a period for the monitoring occasions, N is a smaller of T and nB with nB being number of monitoring occasions within the period T, and the UE_ID is an identifier associated with the UE 120 that is based at least in part on the GUTI. Accordingly, the UE 120 may request a new identifier, such as a new GUTI, in order to obtain a new plurality of monitoring occasions.

In some aspects, the UE 120 may request the new identifier when all of the plurality of monitoring occasions, for the first subscription of the UE 120, collide with the monitoring occasion for the second subscription (e.g., SUB 2 accessed using SIM 405*b*) of the UE 120.

In some aspects, the UE 120 may request the new identifier by transmitting at least one of a registration request or a service request. For example, the UE 120 may transmit, and the base station 410*a* may receive, a registration request and/or another message associated with initial registration, mobility registration, or a periodic registration update. As an alternative, the UE 120 may transmit the registration request to a core network (e.g., an access and mobility function (AMF) and/or another portion of the core network) supporting the base station 410*a* (e.g., using non-access stratum (NAS) signaling). In another example, the UE 120 may transmit, and the base station 410*a* may receive, a service request and/or another message associated with responding to a paging message. As an alternative, the UE 120 may transmit the service request to the core network (e.g., the AMF and/or another portion of the core network) supporting the base station 410*a* (e.g., using NAS signaling).

In some aspects, the UE 120 may identify a network operator associated with the first subscription (e.g., SUB 1 accessed using SIM 405*a*) of the UE 120. For example, some network operators may provide a new GUTI (or at least in a portion of the GUTI, such as a least significant bit (LSB), such that the plurality of monitoring occasions will change) and/or other identifier in response to a registration request and/or a service request and other network operators may not (or may only update a portion of the GUTI, such as a most significant bit (MSB). such that the plurality of monitoring occasions will not change). Accordingly, the UE 120 may determine whether to request the new identifier based at least in part on the identifying. Additionally, or alternatively, some network operators may provide a new identifier or portion of the identifier in response to a registration request while other network operators may provide a new identifier or portion of the identifier in response to a service request. Accordingly, the UE 120 may determine whether to transmit a registration request or a service request based at least in part on the identifying.

Based at least in part on the request, the base station 410*a* may transmit, and the UE 120 may receive, the new identifier. Accordingly, the UE 120 may measure (e.g., as described above in connection with reference number 605) a new plurality of monitoring occasions, for the first subscription of the UE 120, based at least in part on the new identifier. Moreover, the UE 120 may determine (e.g., as described above in connection with reference number 610) whether the monitoring occasion for the second subscription of the UE 120 collides with the new plurality of monitoring occasions, for the first subscription of the UE 120. Furthermore, the UE 120 may select a beam (e.g., as described above in connection with reference number 615*a*) based at least in part on determining whether the monitoring occasion for the second subscription of the UE 120 collides with the new plurality of monitoring occasions.

In some aspects, as described above, the second subscription (e.g., SUB 2 accessed using SIM 405*b*) may be associated with an additional plurality of monitoring occasions. For example, an additional plurality of beams may be associated with the corresponding plurality of monitoring occasions for the second subscription of the UE 120. Accordingly, in addition to or in lieu of requesting a new identifier for the first subscription, the UE 120 may request, from the base station 410*b*, a new identifier for the second subscription. In some aspects, the UE 120 may determine whether to request a new identifier for the first subscription and/or a new identifier for the second subscription based at least in part on identifying a network operator associated with the first subscription and/or a network operator associated with the second subscription, respectively (e.g., as described above).

By using the techniques described in connection with FIG. 6, the UE 120 may avoid monitoring occasion collision (e.g., in an idle mode or an inactive state) and thus be able to respond to paging messages on both the first subscription and the second subscription. Accordingly, the UE 120 may reduce latency and network overhead as well as conserve resources for the UE 120 as well as the base station 410*a* and base station 410*b*.

As indicated above, FIG. 6 is provided as an example. Other examples may differ from what is described with respect to FIG. 6.

Figure 7:
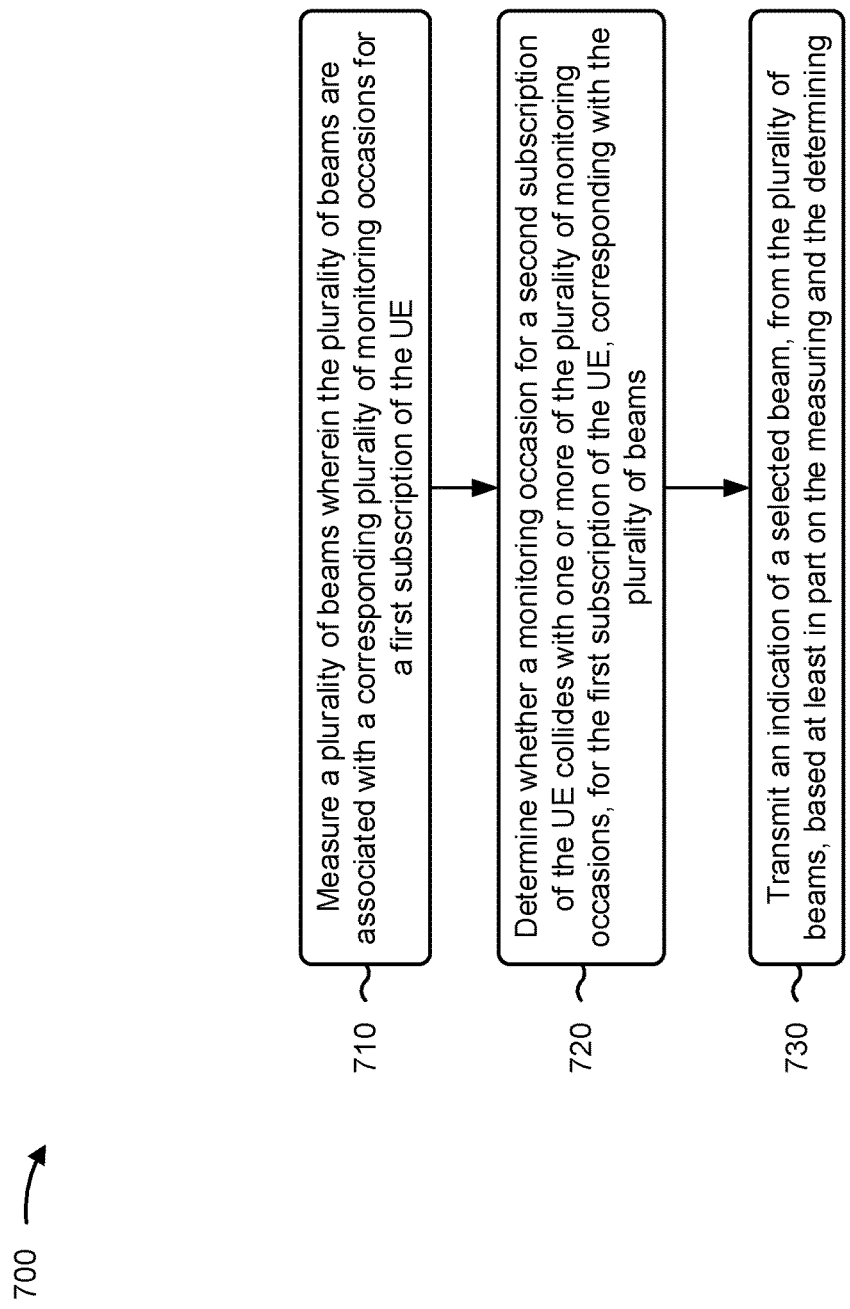
FIGS. 7 and 8 are diagrams illustrating example processes associated with beam selection in idle mode to avoid monitoring occasion collision, in accordance with various aspects of the present disclosure.

FIG. 7 is a diagram illustrating an example process 700 performed, for example, by a UE, in accordance with various aspects of the present disclosure. Example process 700 is an example where the UE (e.g., multi-SIM UE 120 of FIGS. 4 and 6 and/or apparatus 900 of FIG. 9) performs operations associated with beam selection in idle mode to avoid monitoring occasion collision.

As shown in FIG. 7, in some aspects, process 700 may include measuring a plurality of beams, from a base station (e.g., base station 410*a* of FIGS. 4 and 6 and/or apparatus 1000 of FIG. 10) (block 710). For example, the UE (e.g., using measurement component 908, depicted in FIG. 8) may measure the plurality of beams, from the base station, as described above. In some aspects, the plurality of beams are associated with a corresponding plurality of monitoring occasions for a first subscription of the UE.

As further shown in FIG. 7, in some aspects, process 700 may include determining whether a monitoring occasion for a second subscription of the UE collides with one or more of the plurality of monitoring occasions, for the first subscription of the UE, corresponding with the plurality of beams (block 720). For example, the UE (e.g., using determination component 910, depicted in FIG. 9) may determine whether a monitoring occasion for the second subscription of the UE collides with one or more of the plurality of monitoring occasions, for the first subscription of the UE, corresponding with the plurality of beams, as described above.

As further shown in FIG. 7, in some aspects, process 700 may include transmitting, to the base station, an indication of a selected beam, from the plurality of beams, based at least in part on the measuring and the determining (block 730). For example, the UE (e.g., using transmission component 904, depicted in FIG. 9) may transmit, to the base station, the indication of the selected beam, from the plurality of beams, based at least in part on the measuring and the determining, as described above.

Process 700 may include additional aspects, such as any single aspect or any combination of aspects described below and/or in connection with one or more other processes described elsewhere herein.

In a first aspect, measuring the plurality of beams comprises measuring an RSRP for each beam of the plurality of beams.

In a second aspect, alone or in combination with the first aspect, the selected beam satisfies a threshold based at least in part on the measuring.

In a third aspect, alone or in combination with one or more of the first and second aspects, two or more of the plurality of beams are associated with corresponding monitoring occasions, for the first subscription of the UE, that do not collide with the monitoring occasion for the second subscription of the UE, and the selected beam is one of the two or more of the plurality of beams and satisfies a condition.

In a fourth aspect, alone or in combination with one or more of the first through third aspects, the first subscription of the UE is associated with a 5G network, and the second subscription of the UE is associated with a legacy RAT.

In a fifth aspect, alone or in combination with one or more of the first through fourth aspects, the first subscription of the UE is associated with a first 5G network, and the second subscription of the UE is associated with a second 5G network.

In a sixth aspect, alone or in combination with one or more of the first through fifth aspects, the first 5G network is used for data service, and the second 5G network is used for voice service.

In a seventh aspect, alone or in combination with one or more of the first through sixth aspects, process 700 further includes requesting (e.g., using transmission component 904) a new identifier for the first subscription of the UE when all of the plurality of monitoring occasions, for the first subscription of the UE, collide with the monitoring occasion for the second subscription of the UE, where the plurality of beams are associated with a new plurality of monitoring occasions, for the first subscription of the UE, based at least in part on the new identifier; and determining (e.g., using determination component 910) whether the monitoring occasion for the second subscription of the UE collides with the new plurality of monitoring occasions, for the first subscription of the UE, where the selected beam is based at least in part on determining whether the monitoring occasion for the second subscription of the UE collides with the new plurality of monitoring occasions.

In an eighth aspect, alone or in combination with one or more of the first through seventh aspects, requesting the new identifier comprises transmitting at least one of a registration request or a service request.

In a ninth aspect, alone or in combination with one or more of the first through eighth aspects, the new identifier comprises a GUTI.

In a tenth aspect, alone or in combination with one or more of the first through ninth aspects, process 700 further includes identifying (e.g., using determination component 910) a network operator associated with the first subscription of the UE, and the new identifier is requested based at least in part on the identifying.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
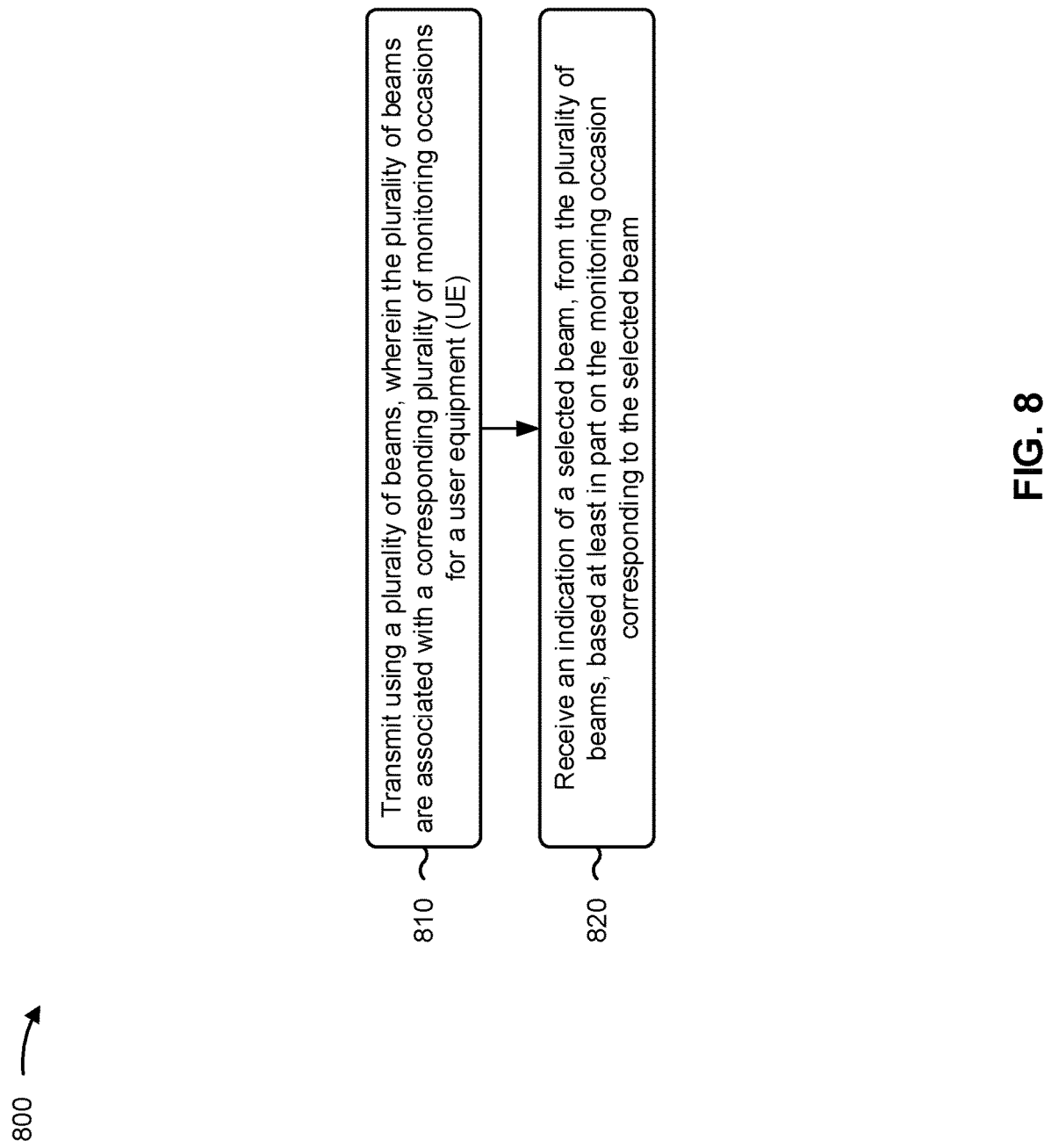

FIG. 8 is a diagram illustrating an example process 800 performed, for example, by a base station, in accordance with various aspects of the present disclosure. Example process 800 is an example where the base station (e.g., base station 410a of FIGS. 4 and 6 and/or apparatus 1000 of FIG. 10) performs operations associated with beam selection in idle mode to avoid monitoring occasion collision.

As shown in FIG. 8, in some aspects, process 800 may include transmitting using a plurality of beams (block 810). For example, the base station (e.g., using transmission component 1004, depicted in FIG. 10) may transmit using a plurality of beams, as described above. In some aspects, the plurality of beams are associated with a corresponding plurality of monitoring occasions for a UE (e.g., multi-SIM UE 120 of FIGS. 4 and 5 and/or apparatus 900 of FIG. 9).

As further shown in FIG. 8, in some aspects, process 800 may include receiving, from the UE, an indication of a selected beam, from the plurality of beams, based at least in part on the monitoring occasion corresponding to the selected beam (block 820). For example, the base station (e.g., using reception component 1002, depicted in FIG. 10) may receive, from the UE, the indication of the selected beam, from the plurality of beams, based at least in part on the monitoring occasion corresponding to the selected beam, as described above.

Process 800 may include additional aspects, such as any single aspect or any combination of aspects described below and/or in connection with one or more other processes described elsewhere herein.

In a first aspect, transmitting the plurality of beams comprises sweeping a reference signal using the plurality of beams.

In a second aspect, alone or in combination with the first aspect, the selected beam satisfies a threshold based at least in part on a measurement of the selected beam.

In a third aspect, alone or in combination with one or more of the first and second aspects, the base station is associated with a 5G network.

In a fourth aspect, alone or in combination with one or more of the first through third aspects, the base station provides data service to the UE.

In a fifth aspect, alone or in combination with one or more of the first through fourth aspects, process 800 further includes receiving (e.g., using reception component 1002), from the UE, a request for a new identifier based at least in part on the plurality of monitoring occasions; and transmitting (e.g., using transmission component 1004), to the UE, the new identifier, where the plurality of beams are associated with a new plurality of monitoring occasions, for the UE, based at least in part on the new identifier, and the selected beam is based at least in part on the new plurality of monitoring occasions.

In a sixth aspect, alone or in combination with one or more of the first through fifth aspects, the request for the new identifier comprises at least one of a registration request or a service request.

In a seventh aspect, alone or in combination with one or more of the first through sixth aspects, the new identifier comprises a GUTI.

In an eighth aspect, alone or in combination with one or more of the first through seventh aspects, the request for the new identifier is received based at least in part on a network operator associated with the base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
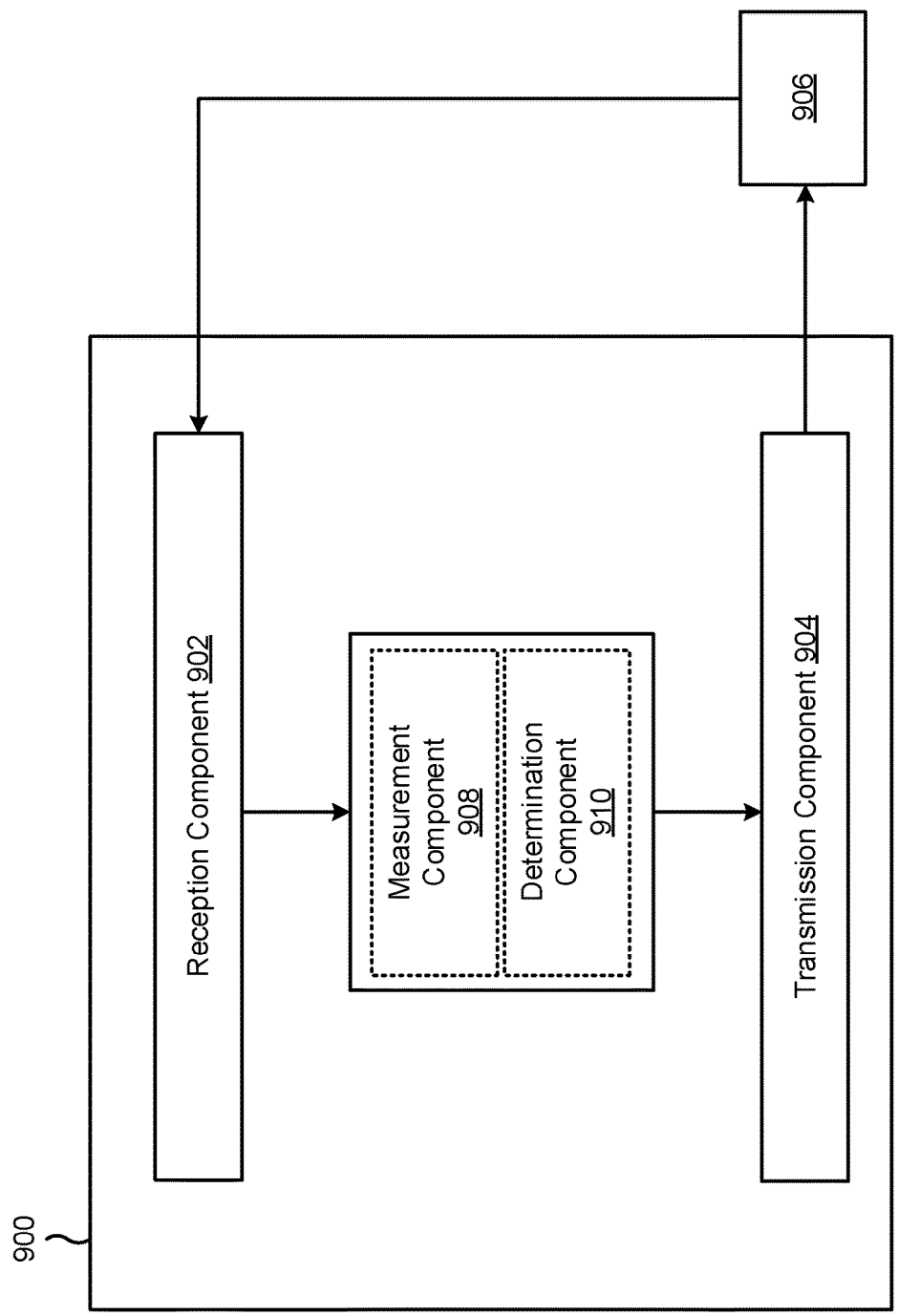
FIGS. 9 and 10 are block diagrams of example apparatuses for wireless communication, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a measurement component 908 or a determination component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

In some aspects, the measurement component 908 may measure a plurality of beams, from the apparatus 906, where the plurality of beams are associated with a corresponding plurality of monitoring occasions for a first subscription of the apparatus 900. In some aspects, the measurement component 908 may include one or more antennas, a demodulator, a MIMO detector, a receive processor, a controller/processor, a memory, or a combination thereof, of the UE described above in connection with FIG. 2. Additionally, the determination component 910 may determine whether a monitoring occasion for a second subscription of the apparatus 900 collides with one or more of the plurality of monitoring occasions, for the first subscription of the apparatus 900, corresponding with the plurality of beams. In some aspects, the determination component 910 may include a MIMO detector, a receive processor, a transmit MIMO processor, a transmit processor, a controller/processor, a memory, or a combination thereof, of the UE described above in connection with FIG. 2. Accordingly, the transmission component 904 may transmit, to the apparatus 906, an indication of a selected beam, from the plurality of beams, based at least in part on the measuring and the determining.

In some aspects, the transmission component 904 may request a new identifier for the first subscription of the apparatus 900 when all of the plurality of monitoring occasions, for the first subscription of the apparatus 900, collide with the monitoring occasion for the second subscription of the apparatus 900. Accordingly, the plurality of beams may be associated with a new plurality of monitoring occasions, for the first subscription of the apparatus 900, based at least in part on the new identifier.

In some aspects, the determination component 910 may further determine whether the monitoring occasion for the second subscription of the apparatus 900 collides with the new plurality of monitoring occasions, for the first subscription of the apparatus 900. Accordingly, the selected beam may be based at least in part on determining whether the monitoring occasion for the second subscription of the apparatus 900 collides with the new plurality of monitoring occasions.

In some aspects, the determination component 910 may identify a network operator associated with the first subscription of the apparatus 900. Accordingly, the transmission component 904 may request the new identifier based at least in part on the identifying.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
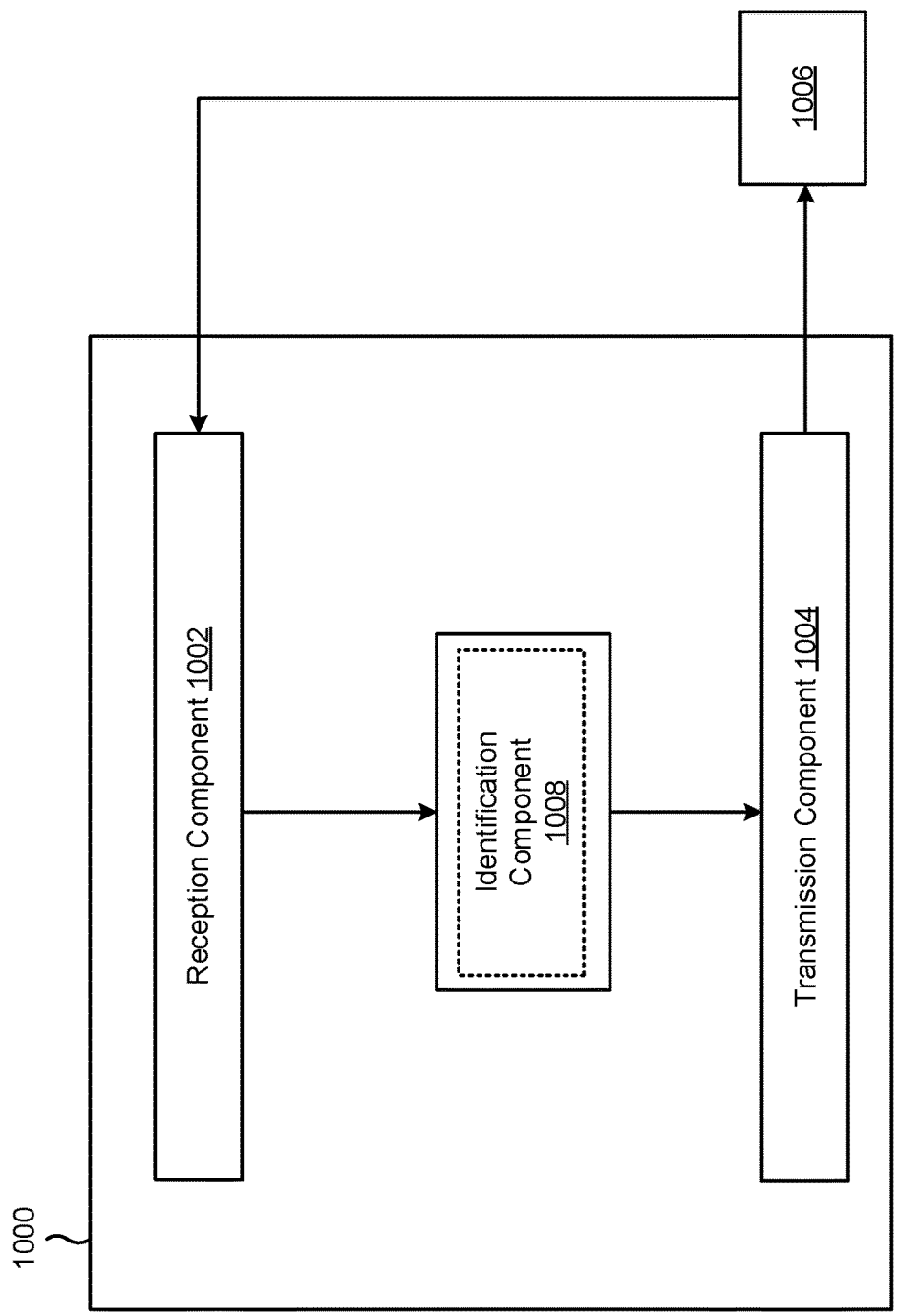

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include an identification component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be collocated with the reception component 1002 in a transceiver.

In some aspects, the transmission component 1004 may transmit using a plurality of beams, where the plurality of beams are associated with a corresponding plurality of monitoring occasions for the apparatus 1006. Accordingly, the reception component 1002 may receive, from the apparatus 1006, an indication of a selected beam, from the plurality of beams, based at least in part on the monitoring occasion corresponding to the selected beam.

In some aspects, the reception component 1002 may receive, from the apparatus 1006, a request for a new identifier based at least in part on the plurality of monitoring occasions. Accordingly, the transmission component 1004 may transmit, to the apparatus 1006, the new identifier. The plurality of beams may be associated with a new plurality of monitoring occasions, for the apparatus 1006, based at least in part on the new identifier, and the selected beam may be based at least in part on the new plurality of monitoring occasions. In some aspects, the identification component 1008 may generate the new identifier or receive the new identifier (e.g., from an AMF and/or other portion of a core network supporting the apparatus 1000). In some aspects, the identification component 1008 may include one or more antennas, a demodulator, a MIMO detector, a receive processor, a controller/processor, a memory, or a combination thereof, of the base station described above in connection with FIG. 2.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    measuring a plurality of beams, from a network entity, wherein the plurality of beams are associated with a plurality of monitoring occasions for a first subscription of the UE;
    determining whether a monitoring occasion for a second subscription of the UE collides with one or more of the plurality of monitoring occasions, for the first subscription of the UE, corresponding with the plurality of beams;
    requesting a new identifier for the first subscription of the UE when all of the plurality of monitoring occasions, for the first subscription of the UE, collide with the monitoring occasion for the second subscription of the UE, wherein the plurality of beams are associated with a new plurality of monitoring occasions, for the first subscription of the UE, based at least in part on the new identifier;
    determining whether the monitoring occasion for the second subscription of the UE collides with the new plurality of monitoring occasions for the first subscription of the UE; and
    transmitting, to the network entity, an indication of a selected beam, from the plurality of beams, that is based at least in part on determining whether the monitoring occasion for the second subscription of the UE collides with the new plurality of monitoring occasions for the first subscription of the UE.

2. The method of claim 1, wherein measuring the plurality of beams comprises measuring a reference signal received power for each beam of the plurality of beams.

3. The method of claim 1, wherein the selected beam satisfies a threshold based at least in part on measuring the plurality of beams.

4. The method of claim 1, wherein two or more of the plurality of beams are associated with corresponding monitoring occasions, for the first subscription of the UE, that do not collide with the monitoring occasion for the second subscription of the UE, and wherein the selected beam is one of the two or more of the plurality of beams and satisfies a condition.

5. The method of claim 1, wherein the first subscription of the UE is associated with a 5G network, and the second subscription of the UE is associated with a legacy radio access technology.

6. The method of claim 1, wherein the first subscription of the UE is associated with a first 5G network, and the second subscription of the UE is associated with a second 5G network.

7. The method of claim 6, wherein the first 5G network is used for data service, and the second 5G network is used for voice service.

8. The method of claim 1, wherein requesting the new identifier comprises transmitting at least one of a registration request or a service request.

9. The method of claim 1, wherein the new identifier comprises a global unique temporary identifier.

10. The method of claim 1, further comprising:
    identifying a network operator associated with the first subscription of the UE,
        wherein the new identifier is requested based at least in part on identifying the network operator.

11. A method of wireless communication performed by a network entity, comprising:
    transmitting using a plurality of beams, wherein the plurality of beams are associated with a plurality of monitoring occasions for a user equipment (UE);
    receiving, from the UE, a request for a new identifier based at least in part on the plurality of monitoring occasions;
    transmitting, to the UE, the new identifier, wherein the plurality of beams are associated with a new plurality of monitoring occasions, for the UE, based at least in part on the new identifier; and receiving, from the UE, an indication of a selected beam, from the plurality of beams, based at least in part on a monitoring occasion corresponding to the selected beam, wherein the selected beam is based at least in part on the new plurality of monitoring occasions.

12. The method of claim 11, wherein transmitting the plurality of beams comprises sweeping a reference signal using the plurality of beams.

13. The method of claim 11, wherein the selected beam satisfies a threshold based at least in part on a measurement of the selected beam.

14. The method of claim 11,
wherein the network entity is a base station, and
wherein the base station is associated with a 5G network.

15. The method of claim 11, wherein the network entity provides data service to the UE.

16. The method of claim 11, wherein the request for the new identifier comprises at least one of a registration request or a service request.

17. The method of claim 11, wherein the new identifier comprises a global unique temporary identifier.

18. The method of claim 11, wherein the request for the new identifier is received based at least in part on a network operator associated with the network entity.

19. A user equipment (UE) for wireless communication, comprising:
a memory; and
one or more processors operatively coupled to the memory, the one or more processors configured to:
measure a plurality of beams, from network entity, wherein the plurality of beams are associated with a plurality of monitoring occasions for a first subscription of the UE;
determine whether a monitoring occasion for a second subscription of the UE collides with one or more of the plurality of monitoring occasions, for the first subscription of the UE, corresponding with the plurality of beams;
request a new identifier for the first subscription of the UE when all of the plurality of monitoring occasions, for the first subscription of the UE, collide with the monitoring occasion for the second subscription of the UE, wherein the plurality of beams are associated with a new plurality of monitoring occasions, for the first subscription of the UE, based at least in part on the new identifier;
determine whether the monitoring occasion for the second subscription of the UE collides with the new plurality of monitoring occasions for the first subscription of the UE; and
transmit, to the network entity, an indication of a selected beam, from the plurality of beams, that is based at least in part on determining whether the monitoring occasion for the second subscription of the UE collides with the new plurality of monitoring occasions for the first subscription of the UE.

20. The user equipment of claim 19, wherein the one or more processors, when measuring the plurality of beams, are configured to measure a reference signal received power for each beam of the plurality of beams.

21. The user equipment of claim 19, wherein the selected beam satisfies a threshold based at least in part on measuring the plurality of beams.

22. The user equipment of claim 19, wherein two or more of the plurality of beams are associated with corresponding monitoring occasions, for the first subscription of the UE, that do not collide with the monitoring occasion for the second subscription of the UE, and wherein the selected beam is one of the two or more of the plurality of beams and satisfies a condition.

23. The user equipment of claim 19, wherein the first subscription of the UE is associated with a 5G network, and the second subscription of the UE is associated with a legacy radio access technology.

24. The user equipment of claim 19, wherein the first subscription of the UE is associated with a first 5G network, and the second subscription of the UE is associated with a second 5G network.

25. The user equipment of claim 19, wherein the one or more processors, when requesting the new identifier, are configured to transmit at least one of a registration request or a service request.

26. The user equipment of claim 19, wherein the one or more processors are further configured to:
identify a network operator associated with the first subscription of the UE,
wherein the new identifier is requested based at least in part on identifying the network operator.

27. A network entity for wireless communication, comprising:
a memory; and
one or more processors coupled to the memory, the one or more processors configured to:
transmit using a plurality of beams, wherein the plurality of beams are associated with a plurality of monitoring occasions for a user equipment (UE);
receive, from the UE, a request for a new identifier based at least in part on the plurality of monitoring occasions;
transmit, to the UE, the new identifier, wherein the plurality of beams are associated with a new plurality of monitoring occasions, for the UE, based at least in part on the new identifier; and
receive, from the UE, an indication of a selected beam, from the plurality of beams, based at least in part on a monitoring occasion corresponding to the selected beam, wherein the selected beam is based at least in part on the new plurality of monitoring occasions.

28. The network entity of claim 27, wherein, when transmitting the plurality of beams, the one or more processors are configured to:
sweep a reference signal using the plurality of beams.

29. The network entity of claim 27,
wherein the network entity is a base station, and
wherein the base station is associated with a 5G network.

30. The network entity of claim 27, wherein the request for the new identifier comprises at least one of a registration request or a service request.

31. The network entity of claim 27, wherein the new identifier comprises a global unique temporary identifier.

* * * * *